United States Patent [19]

Castrignano et al.

[11] Patent Number: 4,957,584
[45] Date of Patent: Sep. 18, 1990

[54] APPARATUS FOR FORMING ENDLESS LOOPS FROM SHEET MATERIAL

[75] Inventors: Frank Castrignano, Fairport; James C. Foote, Jr., York; Robert E. Marowski, Rochester; Richard D. Young, Fairport, all of N.Y.

[73] Assignee: Eastman Kodak Company, Rochester, N.Y.

[21] Appl. No.: 353,833

[22] Filed: May 18, 1989

[51] Int. Cl.⁵ .............................................. B29C 65/08
[52] U.S. Cl. .................................... 156/361; 156/502; 156/580.1
[58] Field of Search .............. 156/361, 502, 503, 580.1

[56] References Cited

U.S. PATENT DOCUMENTS 3,459,610  8/1966  Dijkers et al. .
3,687,786  8/1972  Williams et al. ................ 156/580.1
3,879,256  4/1975  Rust, Jr. .
3,939,033  2/1976  Gregach et al. .
3,947,307  3/1976  Buchscheidt .
4,357,186  11/1982  Calvert .
4,490,199  12/1984  Dunning ............................ 156/502
4,532,166  7/1985  Thomsen et al. .
4,683,017  7/1987  Figiel et al. .
4,838,964  6/1988  Thomsen et al. ................ 156/73.1

Primary Examiner—Peter Kratz
Attorney, Agent, or Firm—Leonard W. Treash, Jr.

[57] ABSTRACT

Apparatus for splicing together opposite ends of a sheet of material, such as a photoconductor, to form an endless loop includes a generally cylindrical drum on which the sheet material is wrapped. The drum has edge portions that can be adjusted relative to each other to vary the circumference of the drum, and the sheet is wrapped on the drum with opposite ends of the sheet being in overlapping relationship adjacent the edges of the drum. The drum edges are adjusted relative to each other while a sensor detects the relationship between perforations or other identifiable features on the sheet. When a predetermined relationship is obtained, the opposite ends of the sheet are bonded together to form an endless loop. The apparatus produces a loop that is cylindrical in shape with the pitch of the perforations across the splice being equal to the pitch of the perforations in other portions of the loop.

10 Claims, 8 Drawing Sheets

APPARATUS FOR FORMING ENDLESS LOOPS FROM SHEET MATERIAL

BACKGROUND OF THE INVENTION

The present invention relates to apparatus for splicing together the ends of a sheet of material to form an endless loop and, more specifically, to such an apparatus which produces a cylindrical loop and accurately locates perforations or other features along an edge of the sheet in the area where the ends of the sheet are spliced together.

United Kingdom Patent Publication No. 2,188,280, published Sept. 30, 1987, discloses an apparatus for fabricating endless photoconductor belts from a web stock. The apparatus comprises a wrap station, a weld station and a discharge station. The web stock in sheet form initially is wrapped around a first mandrel located at the wrap station and held in place on the mandrel by suction applied from inside the mandrel. The web is severed at a point which enables the trailing end of the web to overlap the leading end, thus forming a complete turn on the mandrel. Then the first mandrel is conveyed to the weld station while a second mandrel is moved to the wrap station. At the weld station the overlapping ends of the web stock are welded together ultrasonically to form an endless loop of photoconductor belt. Then the belt and mandrel are advanced to the discharge station where the belt is removed from the apparatus. The belt fabricating apparatus is somewhat complicated due to the need for transporting mandrels between the various stations, and there apparently is no provision for providing exact positioning of features, such as perforations, that are commonly found on photoconductors.

SUMMARY OF THE INVENTION

It is an object of the present invention to provide apparatus for forming an endless loop from a sheet of material at a single work station. Another object of the invention is to provide such apparatus which has provision for precisely locating features, such as perforations, relative to each other adjacent the splice where the ends of the sheet are joined together.

The present invention relates to apparatus for splicing together opposite ends of a sheet of material to form an endless loop of such material wherein the sheet has identifiable features (such as perforations) located along the sheet. The apparatus comprises a generally cylindrical drum having first and second edges, and means for adjusting the edges relative to each other to vary the circumference of the drum. Means are provided for holding the sheet on the drum with the opposite ends of the sheet being in overlapping relationship adjacent the drum edges. The relationship between the identifiable features on the sheet is sensed when the sheet is being held on the drum. Control means operate the drum adjusting means to vary the circumference of the drum and thus adjust the relationship between the identifiable features until a predetermined relationship is obtained. Then the opposite ends of the sheet are bonded together.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
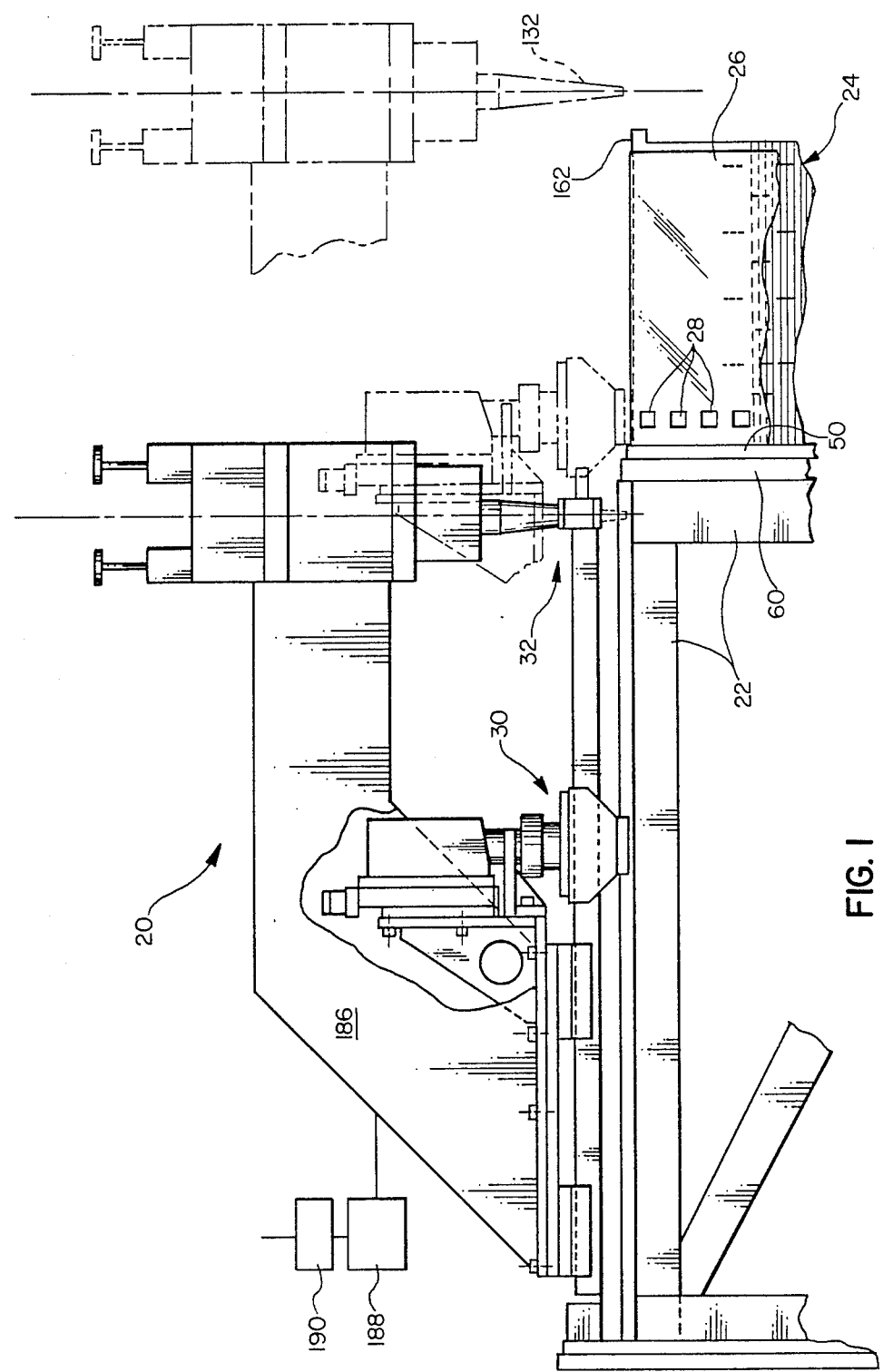
FIG. 1 is a fragmentary elevation view of the apparatus of the invention showing a fragmentary portion of the drum and a sheet on the drum positioned for splicing the ends of the sheet together.
Figure 2:
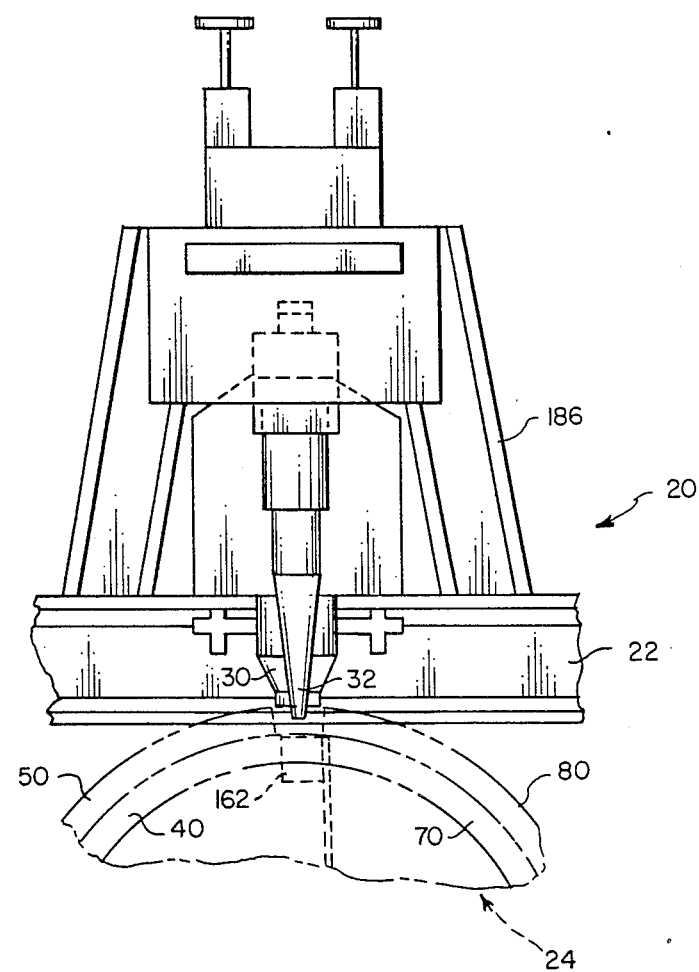
FIG. 2 is a fragmentary view taken from the right side of FIG. 1.

Referring initially to FIGS. 1 and 2, a preferred embodiment of the apparatus of the present invention is generally designated 20 and comprises a frame 22 for supporting the various portions of the apparatus. For example, a drum generally designated 24 is supported by frame 22 and projects from one side thereof. As explained in more detail later, an elongate sheet 26 of material, such as a sheet of photoconductor material, can be positioned around drum 24 and the ends thereof bonded together to form an endless loop. Sheet 26 may have a plurality of equally spaced perforations 28 or other similar features along an edge portion thereof. When such features are present, the ends of the sheet are overlapped and then adjusted with respect to each other to maintain continuity of the pitch between the perforations or other features on the sheet in the area of the overlap. The relationship between the perforations is detected by a vision camera system generally designated 30 which can be positioned directly above the overlap area. The vision camera system acquires a video image of the relationship of the perforation, and then the resulting video signal is input to a computer vision processor of the system where a subpixel measurement is performed on the edge of the perforation. The processor produces an output signal indicative of the relationship between perforations in the area of the overlap. As explained later, this output signal is used to control adjustment of the drum until the desired relationship is obtained between perforations in the area of the overlap. A commercially available vision camera system with a resolution of 512 pixels by 512 pixels is suitable for use with the splicing apparatus. When the overlap area has been adjusted to establish the desired relationship between the perforations, the ends of the sheet are bonded together by, for example, an ultrasonic welding device shown generally at 32.

Figure 3:
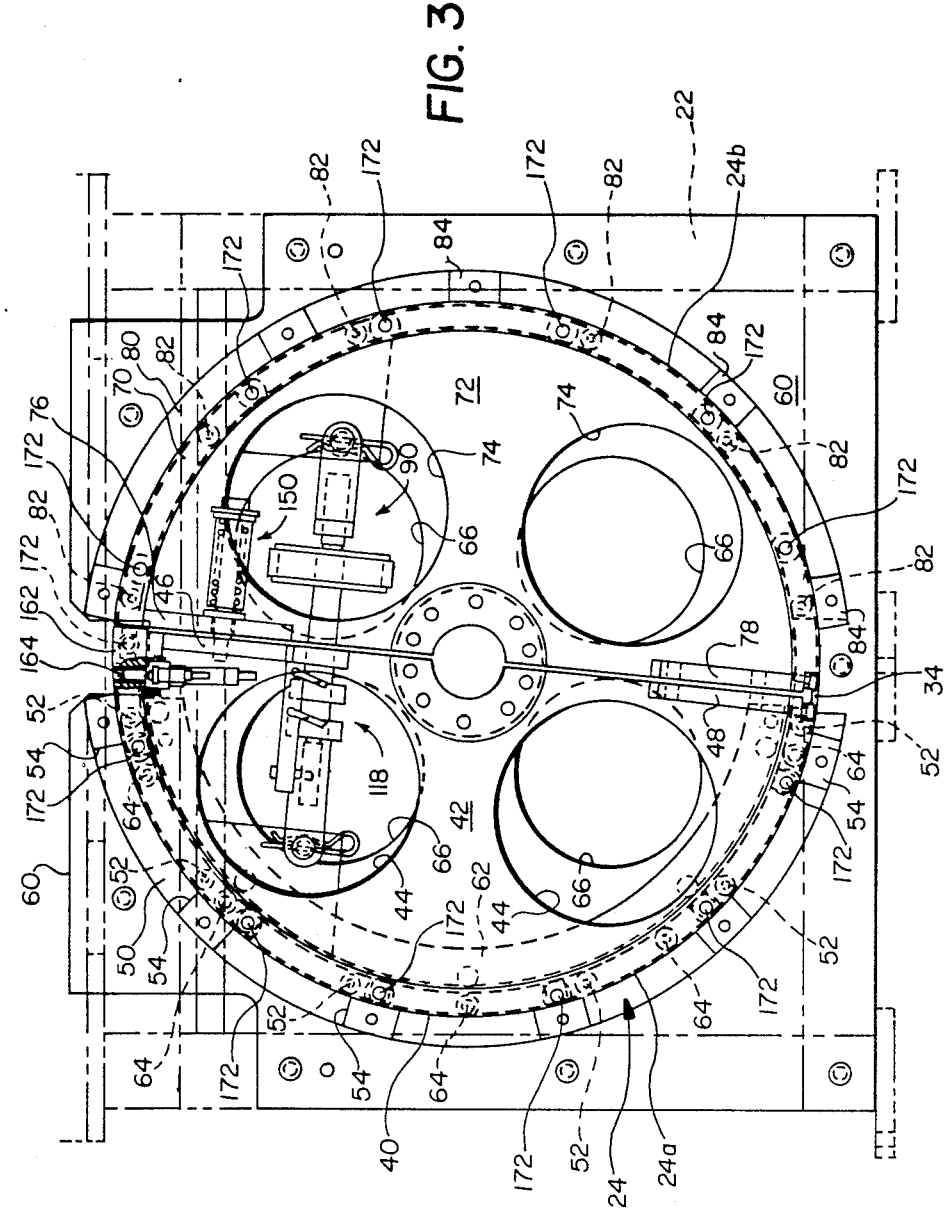
FIG. 3 is an enlarged view of the splicing drum taken from the right side in FIG. 1.
Figure 6:
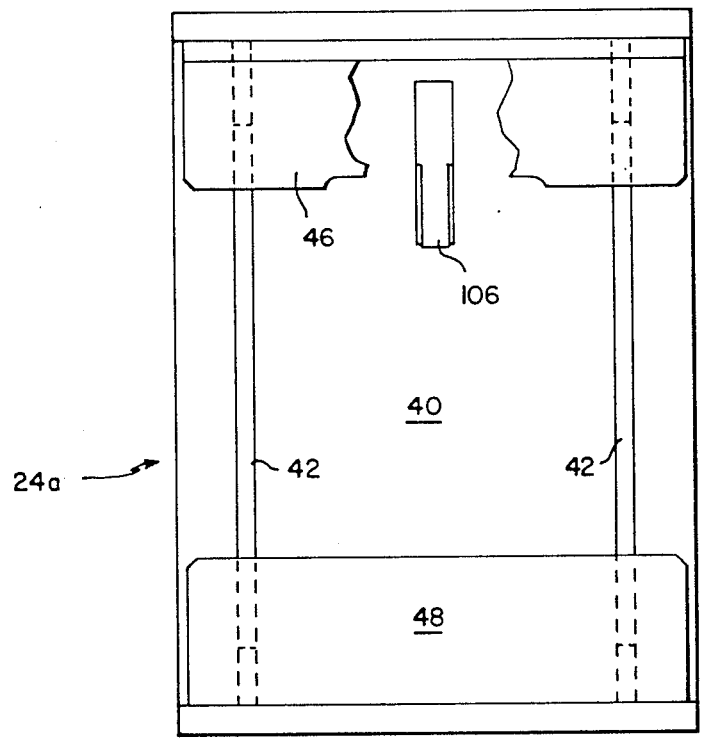
FIG. 6 is an elevation view of the left portion of the drum as viewed in FIG. 3 with portions of the apparatus being deleted to better illustrate the construction of the drum.

Drum 24 will now be described in more detail with particular reference to FIGS. 3, 4 and 6 of the drawings. Drum 24 is preferably made in two substantially semi-cylindrical portions 24a, 24b which are positioned closely adjacent to each other, but slightly spaced from each other. The drum portions 24a, and 24b as illustrated in FIG. 3 are aligned along a plane that is offset in a clockwise direction a few degrees from a vertical plane through the drawing. A hinge or flexure joint 34 is connected to both drum portions 24a, 24b along the lower edge thereof as shown in FIG. 3. Hinge 34 enables the drum portions to move relative to each other about the hinge 34 so that one of the axially extending edges of the drum portions at the top of the drawing can be moved toward and away from the other portion as described in detail later.

Drum portion 24a comprises a generally semi-cylindrical outer wall 40 that is undercut at its radially inner edge and at the end adjacent frame 22. A plurality of semi-circular gudgeons 42 are secured to the inner surface of wall 40 and extend to the right edge of the drum portion 24a. A pair of circular openings 44 are provided in gudgeons 42 to permit access to the interior of the drum for assembly, adjustments etc. Rectangular plates 46, 48 are secured to the outer edges of wall 40 and the gudgeons at the top and bottom edges thereof. Gudgeons 42 and plates 46, 48, when secured to the wall 40 and each other as described, provide a rigid generally semi-cylindrical drum portion that has good structural integrity.

A drum flange 50 of generally semi-circular configuration is secured to one end of wall 40 by bolts 52. Flange 50 is located at the end of the drum adjacent the frame 22, and the inner edge of flange 50 is coextensive with the outer edge of the undercut area. A plurality of locating pads 54 are bolted to flange 50 in the area radially outside the wall 40. Pads 54 establish the position of the left side edge of the sheet 26 of material on the drum.

In order to support the drum on the frame 22, a face plate 60 is bolted to the frame 22. Then a semi-circular drum locating segment 62 is bolted to the face plate. As best shown in FIG. 4, the radially outer edge of the segment 62 is the same diameter as the radially inner edge of the undercut area 41 of wall 40 of the drum portion 24a. When the segment 62 is in place, the drum portion 24a is positioned against the face plate 60 with drum flange 50 abutting the face plate 60 and with the radially inner edge of the undercut area of wall 40 positioned along the outer edge of the segment 62. Then drum portion 24a is bolted to the face plate 60 with a plurality of screws 64. This firmly and rigidly fixes the left portion 24a of the drum to the face plate 60 and thus supports it from the frame 22.

The face plate 60 has a plurality of circular openings 66 which are generally aligned with the openings 44 in gudgeons 42 and in the similar openings described later in drum portion 24b. These overlapping openings permit access to the interior of the drum for installation or maintenance of the apparatus.

Portion 24b of the drum is substantially the mirror image of the drum portion 24a. More specifically, drum portion 24b has a semi-cylindrical wall 70 and a plurality of gudgeons 72 that are welded or otherwise secured to the inner surface of wall 70. Gudgeons 72 have openings 74 that generally overlap the openings 66 in the face plate 60. Rectangular plates 76, 78 are secured to the outer edges of the upper and lower edges of the gudgeons. Plates 76, 78 are in close facing relationship to the corresponding plates 46, 48 of the drum portion 24a.

A drum flange 80 is secured to the edge of wall 70 nearest the face plate 60 by a plurality of bolts 82. Locating pads 84 are provided on the drum flange 80 radially outwardly of the wall 70. These locating pads together with pads 54 serve to establish the position of the sheet 26 on the drum.

While drum portion 24a is bolted directly to the face plate 60 as explained hereinbefore, drum portion 24b is moveable relative to portion 24a about the hinge or flexure 34. Thus a locating segment as shown at 62 is not required for the drum portion 24b. Moreover, the edge of the drum portion 24b nearest to the face plate 60 needs to be spaced from plate 60 so the drum portion can move relative to that plate. This spacing can be assured by making the drum flange 50 for portion 24a somewhat thicker than the drum flange 80 for the drum portion 24b. In addition, a spacer or shim (not shown) can be provided between drum flange 50 and face plate 60 to separate the drum flanges from the face plate 60 by a distance sufficient to enable the drum portion 24b to move about the hinge 34.

Drum portion 24b is pivoted about hinge 34 and relative to portion 24a by a power driven differential screw assembly generally designated 90. Referring to FIG. 4, the differential screw assembly comprises a shaft 92 having its left end threaded into one end of a clevis 94, and the right end of the shaft is threaded into one end of a second clevis 96. A pulley 98 is fixed to the shaft 92 and a belt 100 is trained around the pulley and driven from a motor (not shown) so that the shaft 92 can be rotated in two opposite directions.

Figure 5:
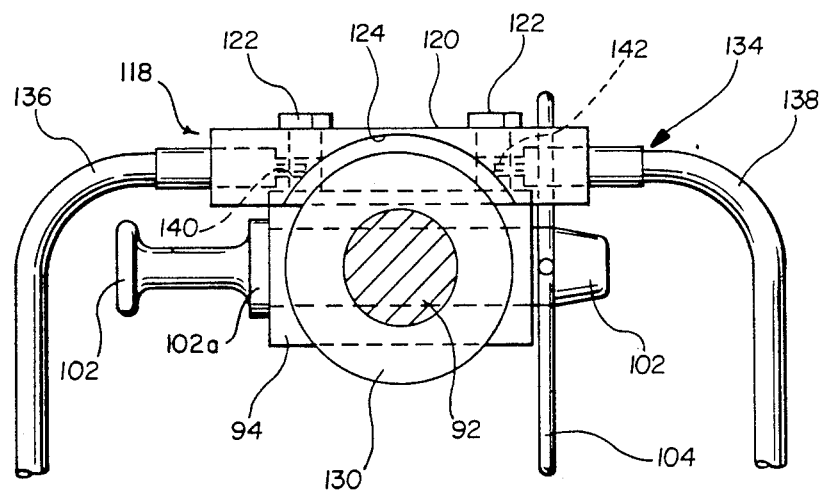
FIG. 5 is a fragmentary section taken along line 5—5 of FIG. 4.

Clevis 94 has a bifurcated end portion 94a with an opening 94b which receives the shank of a pin 102. As best shown in FIG. 5, the pin has an enlarged head 102a that engages one side of clevis 94, and a hitch pin 104 passes through the other end of pin 102. Head 102a and the hitch pin 104 hold the pin 102 against inadvertent movement relative to the clevis. Pin 102 also passes through a clevis support plate 106 that is secured to the inner surface of the cylindrical wall 40 of the drum and fits between inside the bifurcated end 94b of the clevis. In this manner the clevis 94 is pivotally attached to the drum portion 24a.

In a similar manner, clevis 96 has a bifurcated end portion 96a with an opening 96b which receives a pin 108. A hitch pin 110 passes through the pin 108. The pin 108 also extends through a support plate 112 which is secured to the inner surface of cylindrical wall 70 of drum portion 24b. Thus clevis 96 is pivotally attached to the drum portion 24b.

Preferably the threads on the left end of shaft 92 and the right end clevis 94 are the same hand threads as on the right end of shaft 92 and the left end of clevis of 96. For example, both are right-hand threads. In addition, preferably the pitch of the threads on the left end of the shaft and clevis 94 differ from the pitch of the threads on the right end of the shaft and the of clevis 96. With this preferred arrangement rotation of the shaft 92 in one direction causes the shaft to be screwed into the clevis 94 while it is being unscrewed from the clevis 96, and when the rotation of the shaft is reversed the shaft is screwed out of clevis 94 while it is screwed into clevis 96. With the pitch of the threads being different, this arrangement enables vary small relative movement of the upper edge of drum portion 24b relative to drum portion 24a in response to rotation of the shaft. By way of example, the threads on the shaft and clevises can be selected so that one complete revolution of the shaft will unscrew the shaft from the left clevis by 0.1 inch while simultaneously the right end of the shaft will be screwed into clevis 96 by 0.125 inch, thus resulting in a net movement of the upper edge of drum portion 24b toward drum portion 24a. The distance the upper edge of drum portion 24b moves is a function not only of the relationship of the threads as discussed above, but also of the relationship of the distance from the hinge axis to the pin 108 of the differential screw assembly and the distance from the hinge axis to the upper edge of drum portion 24a. The ability to achieve slight but controlled adjustment of drum portion 24b relative to portion 24a enables precise positioning of the overlapping portions of the ends of sheets 26, as explained later during the description of FIGS. 10–12.

Figure 4:
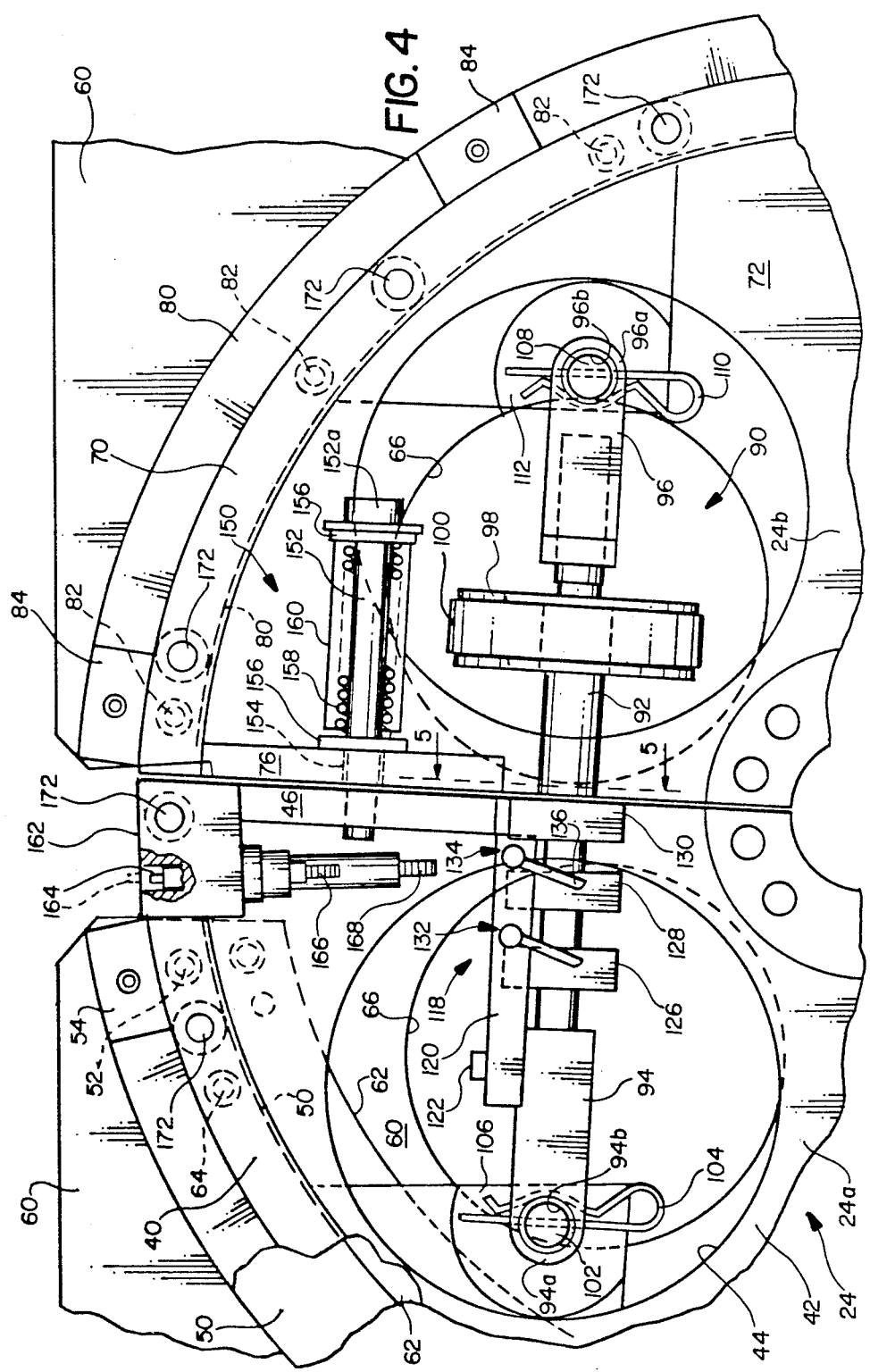
FIG. 4 is an enlarged fragmentary view of the upper portion of the drum of FIG. 3.

Sensing apparatus generally designated 118 in FIGS. 4 and 5 detects the movement of the shaft 92 and thus the position of drum portion 24b relative to the drum portion 24a. Sensing apparatus 118 comprises a sensor mounting plate 120 which is attached by bolts 122 to clevis 194. A portion of the plate 120 is cantilevered over the top of shaft 92 and has an arcuate recess 124 in the lower surface thereof.

Three annular shaft collars 126, 128 and 130 are secured to shaft 92 for rotation and axial movement with the shaft. The outer diameters of the collars are such that they can fit within and are spaced from the recess 124 in the mounting plate 120. Collar 126 is used for determining the "home" position of the shaft 92. Collar 128 determines the maximum closed position of drum portion 24b relative to portion 24a, and collar 130 determines the maximum open position of the drum portion 24b relative to portion 24a.

The movement of collars 126, 128, and 130 is sensed by two optical sensing devices 132 and 134. As best illustrated in FIG. 5, the sensing device 134 comprises a light emitter 136 that is connected to the left side of the mounting plate 120, and a light receiver 138 that is connected to the right side of the mounting plate. The light emitter may comprise a bundle of optical fibers that provide light from a remote source (not shown) to the mounting plate. Similarly, the receiver 138 can comprise a bundle of optical fibers which receive light from the emitter 136 and transmits the light to a transducer (not shown) which signals the presence or absence of light in receiver 138. The emitter 136 and receiver 138 are connected to the mounting plate so that light from the emitter can travel through a passageway 140 in the plate and then pass through the arcuate recess 124 in the plate to enter another passageway 142 in the plate for delivery to the light receiver 138. Sensing device 132 is the same as device 134 and is spaced a short distance from device 134.

The passageways 140, 142 and other elements of the light transmitting system are located relative to the shaft collars 126, 128, and 130 so that the light beam through the recess 124 can be interrupted as a result of movement of the collars through the recess 124. More specifically, the sensing device 134 is positioned so that normally light passing therethrough will travel a path between the collars 128 and 130. The collar 128 is located on shaft 92 so that when it interrupts the light beam of sensing device 134 the drum portion 24b is in its maximum closed position relative to drum portion 24a. Similarly, when the sensing device 134 senses collar 130, the drum portion 24b is in the maximum open position relative to the drum portion 24a. Sensing device 132, on the other hand, is located relative to collar 126 so that when drum portion 24b is in its normal "home" position relative to drum portion 24a the collar 126 will interrupt the light beam through the device 132. The "home" position is between the maximum open and closed positions.

It is desirable to move drum portion 24b relative to drum portion 24a precisely and with predictable accuracy. As explained hereinbefore, movement of shaft 92 relative to the clevises 94 and 96 can produce extremely small incremental movements per revolution of the shaft 92. In order to take advantage of this small relative movement, when translated to the relative movement between the drum portion 24b and portion 24a, it is important that the drum portion 24b be biased toward one position relative to drum portion 24a such as the closed position. Such a bias will "load" the threaded end portions of shaft 92 relative to the clevis 94 and 96 and thus make adjustment of the drum portion 24b more precise. A preferred means for biasing drum portion 24b relative to drum portion 24a is shown generally at 150 and best illustrated in FIG. 4. The biasing means 150 comprises a screw 152 having a threaded shank portion which is screwed into plate 46 of drum portion 24a and extends loosely through a hole 154 in plate 76. A pair of thrust washers 156 are positioned loosely around the shank portion of the screw 152 with one of the washers being adjacent plate 76 and the other being adjacent head 152a of the screw. A coil spring 158 is positioned around the shank portion of the screw 152 and is compressed between the thrust washers 156. A sleeve 160 is positioned around the spring and has end portions that are engageable with the thrust washers 156.

Screw 152 is fixed in place because it is threaded into the plate 46 of the stationary portion 24a of the drum. Thus the force exerted by spring 158 is directed against the plate 76 of the moveable portion 24b of the drum to urge plate 76 toward plate 46. This biasing force serves to maintain tight engagement between the threads on the ends of the shaft 92 and the threads of clevises 94, 96, thus taking up any "play" in the threaded connection between the shaft 92 and the clevises. This loading of the shaft and clevis connection produces a high degree of preciseness in the ability of differential screw assembly 90 to exactly locate the ends of the sheet 26 relative to each other as explained in more detail later in connection with FIGS. 8–10. While only one biasing means 150 is illustrated in FIG. 4, it will be understood that two or more such biasing means can be located in spaced relation along the length plate 76.

An elongate anvil 162 for the ultrasonic welding device 32 is secured to the stationery drum portion 24a. The outer surface of the anvil is flat and extends between the adjacent edges of the walls 40 and 70 of the drum. The anvil is located at the top of the drum and adjacent the edge of the moveable drum portion 24b. As is apparent in FIGS. 3 and 4, there is a notch is the face plate 60 at the end of the anvil nearest the face plate. Also, the drum flanges 50 and 80 are spaced from each other in the area of the anvil so that there is an open space directly above the anvil for travel of the ultrasonic welding device 32.

A locating pin 164 is carried by the anvil and preferably is mounted for movement between a retracted position, shown in solid lines in FIG. 4, and an extended position illustrated in phantom in FIG. 4. The pin 164 can be moved between its two positions by air under pressure provided through fittings 166 and 168. When the sheet 26 of material is to be positioned around the drum 24, the pin 164 is extended and the sheet is located on the drum by placing a perforation onto the pin. After the sheet is located on the drum the pin is retracted prior to movement of the ultrasonic sealing device over the anvil to effect sealing of the ends of the sheet together.

Means are provided for holding sheet 26 firmly in place on the surface of the drum while the ends thereof are adjusted relative to each other and are welded together. The sheet holding means preferably comprises a vacuum system for applying a vacuum to the outer surface of the walls 40 and 70 of drum portions 24a, 24b and to the outer surface of the anvil 162. This can be accomplished by drilling a plurality of holes 172 in an axial direction through the semi-cylindrical walls 40 and 70 of the drum portions and through the anvil 162. The ends of each of the holes 172 nearest the face plate 60 are connected to a source of vacuum, shown diagramatically at 174 in FIG. 8. The other ends of the holes 172 opposite from the face plate 60 are closed by suitable plugs (not shown).

Figure 8:
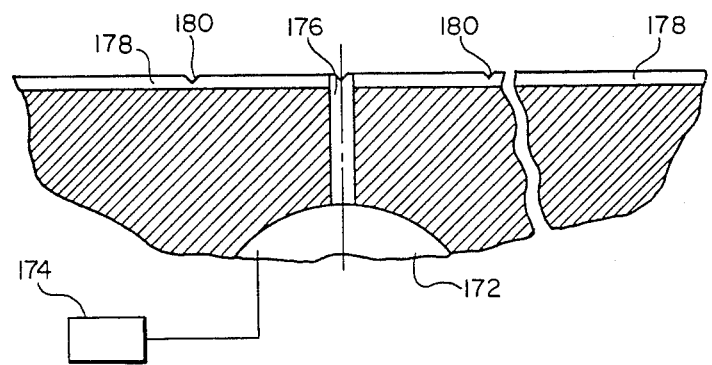
FIG. 8 is an enlarged fragmentary cross-sectional view taken along lines 8—8 in FIG. 7.
Figure 7:
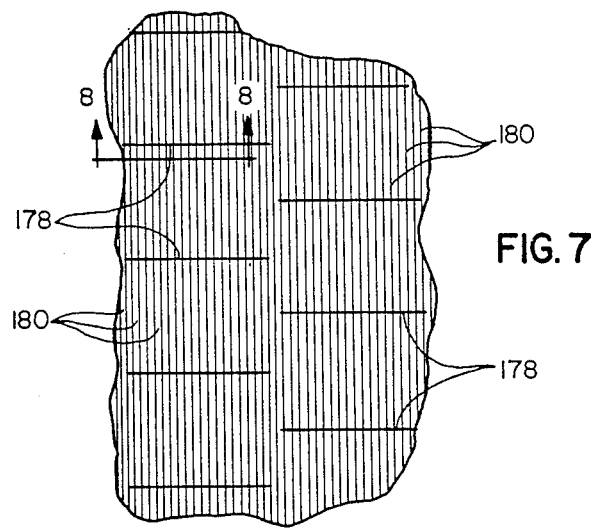
FIG. 7 is a fragmentary elevation view of the surface of the drum showing vacuum slots and grooves for holding sheet on the drum.
Figure 9:
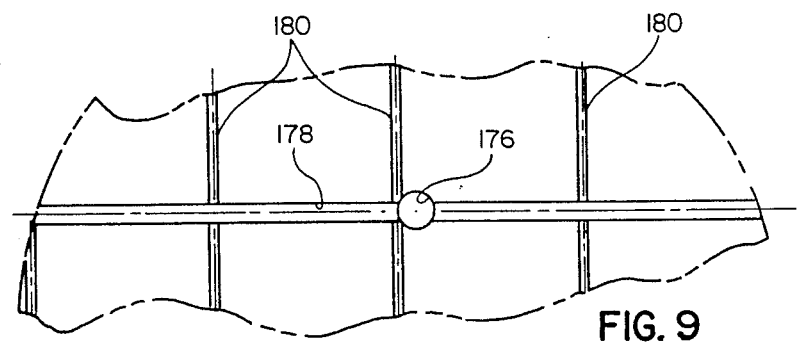
FIG. 9 is an enlarged view of a portion of the drum surface shown in FIG. 7.

Referring now to FIGS. 7-9, a plurality of ports 176 are provided in walls 40, 70 and extend between the holes 172 and the outer surface of the walls. On the surface of the walls 40, 70 the ports 176 communicate with circumferentially extending grooves 178. As shown in FIG. 7, the grooves 178 are generally parallel to each other with one set of grooves being offset in an axial direction from another set of grooves. A plurality of grooves 180 in the outer surface of walls 40, 70 extend in a direction perpendicular to the grooves 178. Grooves 180 are smaller than the grooves 178 and extend in an axial direction crossing a plurality of the grooves 178. With this arrangement of grooves, vacuum from source 174 is be applied through holes 172, ports 176, and grooves 178, 180 throughout the surface area of the walls 40, 70 and the anvil 162 in order to hold sheet 126 in place on the drum. Preferably valves in the vacuum system enable vacuum to be applied separately to drum portion 24a and the left part of anvil 162, and to drum portion 24b and the right part of anvil 162. If desired the valves can apply vacuum sequentially to the left part of the anvil, then to a series of drum segments extending counter-clockwise (as viewed in FIG. 3) and finally to the right part of the anvil.

Referring now to FIGS. 1 and 2, camera system 30 and welding device 32 are supported by a frame 186. Frame 186, in turn, is mounted for reciprocal movement relative to frame 22 in right and left directions as viewed in FIG. 1 so that camera system 30 and welding device 32 can be moved between their respective retracted positions shown in solid lines and extended positions illustrated in phantom. This sliding movement of the frame 186 and associated parts can be affected in any suitable manner, for example by a drive mechanism shown diagrammatically at 188. The drive mechanism 188 is under control of a logic and control unit 190 for the apparatus. The control unit 190 is also coupled to other parts of the apparatus, such as the motor for the differential screw assembly 90, sensing apparatus 118 and other elements of the apparatus in order to control operation of the apparatus 20.

Figure 10:
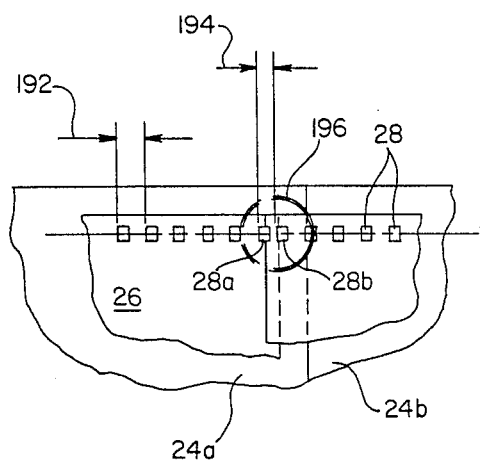
FIG. 10 is a fragmentary plan view of the initial position of the overlapping edge portions of the sheet on the drum.
Figure 11:
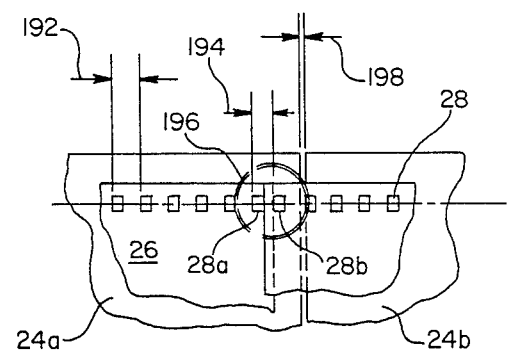
FIG. 11 is a view similar to FIG. 10 but after some relative movement between the overlapping ends of the sheet and portions of the drum.
Figure 12:
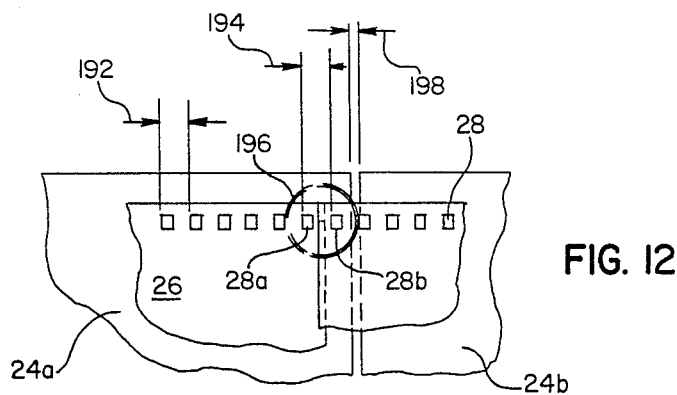
FIG. 12 is a view similar to FIGS. 10 and 11 but showing the final position of the overlapping edges of the sheet and portions of the drum after adjustment of the drum to bring adjacent perforations of the ends of the sheet into proper alignment before welding of the ends of the sheet together to form a loop.

Operation of the splicing apparatus 20 will now be described. By way of example it will be assumed that the apparatus is used for splicing together the ends of a sheet 26 having a photosensitive emulsion on one surface thereof. Sheets of this kind are formed into endless loops and used as a photoconductor in a electrographic copier/duplicator. Also, the description of the operation will relate to a sheet 26 having a series of equally spaced perforations 28 along at least one side edge thereof wherein the perforations 28 are spaced apart by a distance 192 (FIGS. 10-12). For endless photoconductors with perforations it is important for the loop to be cylindrical in shape and for the perforations across the weld to be spaced apart the same distance 192 as the other perforations.

Before splicing operations begin the drum portion 24b is driven by differential screw assembly 90 to the "home" position. The differential screw drive is stopped when shaft collar 126 of sensing apparatus 118 is detected by optical sensing device 132. At the home position the upper edge of drum portion 24b is adjacent drum portion 24a. At this time the circumference of the drum is equal to or slightly smaller than the circumference of the image loop that is to be formed. With the sheet 26 cut to the desired length the machine operator registers the edge 26 having the perforations thereon against the locating pads 54 on drum flange 50. The edge of the sheet 26 perpendicular to the perforations 28 is positioned over the anvil so that it is along the path of travel of the anvil. The sheet edge is substantially parallel to the edge of the drum portions 24a, 24b and the edge of the sheet is spaced from the edges of the drum portions as illustrated in FIGS. 10-12. At this time the locating pin 164 in the anvil is extended above the surface of the anvil and into a perforation spaced from the perforation 28a that is at the end of the sheet as shown in FIG. 10. The pin thus helps to establish the position of sheet on the anvil. By separating pin 164 from the end perforation 28a, it is outside the field of view of camera 30, as explained later. Then vacuum is applied to the left side portion of anvil 162 from source 174 and vacuum in grooves 178, 180 will attract and hold the sheet 26 on the anvil. At this time the locating pin 164 is retracted.

The operator carefully brings sheet 26 into contact with drum portions 24a and 24b, and the right side of the anvil, making certain that there are no creases or wrinkles in the sheet. The sheet is brought around the drum portion 24b with the side edge of the sheet abutting the locating pads 84 on drum flange 80 until the ends of the sheet overlap as shown in FIG. 10. Assuming the circumference of the drum at its home position is slightly smaller than the circumference of the image loop to be formed, the spacing 194 between the perforation 28a at one end of the sheet and the perforation 28b at the other end of the sheet 26 is slightly less than the spacing 192 between adjacent perforations along the sheet. With the ends of sheet 26 overlapped in the manner illustrated, and when the sheet is free of wrinkles or creases along drum portions 24a and 24b, vacuum is applied to both drum portions and the right side portion of anvil 162 so that the sheet is firmly tacked to the anvil and both portions of the drum. The ends of the sheet overlap as indicated in FIG. 10.

When the operator is satisfied that sheet 26 is properly positioned on the drum, the switch is closed and the control 190 activates the drive 188 to transport frame 186 to the right from its FIG. 1 position and thereby bring the vision camera system 30 and ultrasonic welding device 32 to the positions illustrated in dotted lines in FIG. 1. As this movement occurs the welding device 32 is elevated above the drum and the welding device is deactivated so that no weld is formed on the overlapping portions of the sheet 26.

When camera system 30 is in the dotted line position in FIG. 1, the field of view of the camera system comprises the circular area shown at 196 in FIGS. 10–12. The field of view 196 includes perforations 28a, 28b but not the location pin 164. As explained earlier, the vision camera system produces an electronic signal indicative of the relationship between perforations 28a and 28b in the area of the overlap. This signal is provided to the machine logic and control unit 190.

Since the initial spacing 194 between perforations 28a, 28b is less than the normal pitch 192 between perforations 28, the logic and control 190 will activate the drive to the differential screw assembly 90 to initiate movement of the drum portion 24b away from the anvil and drum portion 24a. This condition is illustrated in FIG. 11 where the drum portion 24b is separated from the anvil by a spacing designated 198. At this time the spacing 194 between perforations 28a, 28b has increased but is not yet equal to the spacing 192 between adjacent perforations on sheet 26. The differential screw assembly 90 is driven until the condition shown in FIG. 12 is met, i.e., the perforations 28a, 28b are spaced by a distance equal to the spacing 192 between other perforations on the sheet. When this condition is sensed by the vision camera system 30, an electronic signal is provided to the control 190 to immediately stop the drive to the differential screw assembly 90 and thus stop movement of the drum portion 24b relative to the anvil. At this time the spacing 198 between the anvil and drum portion 24b is slightly greater than in FIG. 11.

Control 190 then lowers the ultrasonic welding device 32 and, through drive 188, moves the welding device from its dotted line position in FIG. 1 to the solid line position while operating the welding device. The overlapping edges of the sheet 26 are welded together during this movement of the welding device. This results in an endless loop of material having a continuous weld line in the overlapped area and with the perforation pitch across the weld area being equal to the perforation pitch along other portions of the sheet of material.

When the weld in complete the controller 190 shuts off the vacuum to drum portions 24a, 24b and, if desired, a positive low pressure air can be provided through the vacuum ports to the drum to facilitate separation of the loop of material from the drum. Also, the controller will operate the differential screw assembly 90 in a direction to drive drum portion 24b toward drum portion 24a until the home position is reached so that the material 26 can be removed easily from the drum.

As explained above, the shaft collar 126 and sensing device 132 stop movement of drum portion 24b at its usual closed position and the vision camera system stops drum portion 24b at its usual open position. However, if drum portion 24b is not stopped by the sensing device or by the camera system, it will be stopped in response to sensing device 134 detecting either collar 128 or collar 130.

If the operator desires to use the apparatus for sheets 26 of a different length, then the drum 24 is removed from plate 60 and replaced with a drum of a different diameter. Also, while the apparatus and its operation have been described with respect to sheets of material 26 having features such as perforations 28 which need to be accurately located with respect to each other, the apparatus can also be used for sheets 26 not having features of this type. When perforations or other such features are not present on sheet 26, a drum of fixed diameter can be used.

The apparatus of the present invention produces endless loops from sheet material at a single work station by a single operator. It also precisely locates perforations in the area of the overlap so that the pitch in the overlap area is the same as in other areas of the sheet. Another advantage of the apparatus is its ability to produce closed loops of material of a cylindrical shape. This results from the material being held by the drum in a cylindrical shape at the time the ends are welded together.

The invention has been described in detail with particular reference to a preferred embodiment thereof, but it will be understood that variations and modifications can be effected within the spirit and scope of the invention.

We claim:

1. Apparatus for splicing together opposite ends of a sheet of material to form an endless loop of such material, the sheet having identifiable features located at a predetermined relationship along the sheet, the apparatus comprising:
   a generally cylindrical drum having first and second axially extending edges,
   means for adjusting the drum edges relative to each other to vary the circumference of the drum,
   means for holding the sheet on the drum with the opposite ends of the sheet being in overlapping relationship adjacent the drum edges,
   means for sensing the relationship between the identifiable features at the overlapping ends of the sheet when the sheet is being held on the drum,
   control means for operating the adjusting means to vary the circumference of the drum and thus adjust the relationship between the identifiable features at the overlapping ends until the predetermined relationship is obtained, and
   means for bonding the opposite ends of the sheet together after such predetermined relationship is obtained.

2. Apparatus as set forth in claim 1 wherein the drum comprises first and second portions having semi-cylindrical outer walls, means hinging the portions together so that the second portion can be moved relative to the first portion.

3. Apparatus as set forth in claim 2 wherein the sheet holding means comprises a plurality of grooves in the outer walls, and means for connecting the grooves to a vacuum source.

4. Apparatus as set forth in claim 2 wherein the adjusting means comprises a differential screw assembly connected to the first and second drum portions in spaced relation to the hinging means, and means for driving the assembly in first and second opposite directions.

5. Apparatus for splicing together opposite ends of a sheet of a photoconductor to form an endless loop of such photoconductor, the sheet having a plurality of perforations located at regular intervals along one side edge of the sheet, the apparatus comprising:

a generally cylindrical drum comprising first and second drum portions having axially extending edges located adjacent to each other and mounted for movement relative to each other to vary the circumference of the drum, drive means for moving the drum portions toward and away from each other, a vacuum platen for holding the sheet on the drum with the opposite ends of the sheet in overlapping relationship adjacent the drum edges, a camera system for sensing the relationship between the perforations at the overlapping ends of the sheet when the sheet is being held on the drum, control means for operating the drive means to vary the circumference of the drum and thus adjust the relationship between adjacent perforations on the overlapping ends of the sheet until a predetermined relationship is obtained, and means for bonding together the overlapping portions of the ends of the sheet after such predetermined relationship is obtained.

6. Apparatus as set forth in claim 5 further comprising hinge means connecting the drum portions together, the hinge means being spaced from the axially extending edges of the drum portions, and the drive means comprises a differential screw assembly connected to the drum portions for effecting relative movement between the drum portions.

7. Apparatus as set forth in claim 6 further comprising means for sensing movement of the drum portions (1) to a first relative position wherein the drum edges are at a maximum open position and (2) to a second relative position wherein the drum edges are at a maximum closed position, the sensing means being associated with the differential screw assembly so that the sensing means detects relative movement between portions of the differential screw assembly.

8. Apparatus as set forth in claim 5 wherein the bonding means comprises an ultrasonic welding device, and the apparatus further comprises means mounting the welding device and the camera system system for conjoint movement between (1) a first position wherein they are spaced from the drum to facilitate positioning of the sheet onto the drum and (2) a second position wherein they overlie the drum with the camera system being over the perforations at the one side edge of the sheet and the welding device is adjacent the other side edge of the sheet, and the welding device being operable during movement from its second to its first position to ultrasonically weld the ends of the sheet together.

9. Apparatus as set forth in claim 8 further comprising an anvil carried by the first drum portion, the welding device being movable over the anvil as the device moves from its second position to its first position, and the apparatus further comprising a registration pin carried by the first drum portion and positioned to locate a perforation adjacent one end of the sheet relative to the anvil.

10. Apparatus as set forth in claim 5 further comprising a flange at one side edge of each of the drum portions, and a plurality of locating pads on the flanges so that the one side edge of the sheet can be placed against the pads to locate the sheet on the drum.

* * * * *